3,247,251
CYCLOHEXYLAMINE BORATES AND PRODUCTION THEREOF

Michael Peter Brown, East Molesey, Surrey, Anthony Edward Dann, Chiswick, London, and Derek Graham Older, Weybridge, Surrey, England, assignors to United States Borax & Chemical Corporation, Los Angeles, Calif.
No Drawing. Filed Sept. 6, 1963, Ser. No. 306,997
Claims priority, application Great Britain, Sept. 27, 1962, 36,789/62
10 Claims. (Cl. 260—563)

This invention relates to boron compounds, and in particular to certain novel amine-borate compounds.

The new compositions provided by the present invention are cyclohexylamine triborate and cyclohexylamine tetraborate, which can be represented (in their hydrated forms) by the formulae $C_6H_{11}NH_2 \cdot 1.5B_2O_3 \cdot 2.5H_2O$ and $C_6H_{11}NH_2 \cdot 2B_2O_3 \cdot 4H_2O$, respectively.

The amine borates can be prepared by reacting cyclohexylamine and boric acid either in a homogeneous phase, using a solution of both reactants in a suitable common solvent, which will usually be water, or in a heterogeneous system, using either no solvent or insufficient solvent to dissolve the reactants completely.

The homogeneous phase method may be carried out by heating a solution of the amine and boric acid in water or other solvent, and then either cooling the solution until the desired compound crystallizes out, if desired after concentrating it by evaporating part of the solvent, or by evaporating all of the solvent, preferably by a method such as spray drying in which the solvent, together with any of the amine that may not have reacted, is evaporated very rapidly. Which of the two borates is obtained depends primarily on the relative proportions in which the cyclohexylamine and boric acid are employed. When 4 equivalents of boric acid (corresponding to $2B_2O_3$) are employed for each mole of amine, the substantially pure tetraborate is obtained. If 3 equivalents of boric acid are used, a mixture of cyclohexylamine triborate and tetraborate in more or less equal proportions is formed; with decreasing proportions of boric acid the proportion of triborate in the product increases, until, when the proportion of boric acid is reduced to about 2 equivalents, the triborate is usually obtained as substantially the only product. The exact proportion of boric acid required to give any desired product, especially the substantially pure triborate, will depend to some extent on the other reaction conditions, notably the proportion of water present, and can readily be determined for any particular set of conditions.

When water is used as the solvent, both compounds are obtained in the hydrated forms indicated above. If the unhydrated salts or lower hydrates are required, they can be obtained by carefully heating the hydrated salts.

The heterogeneous method is preferred when a triborate is desired, as leading more easily to its formation in the substantially pure state, but it can also be used to make a tetraborate. When the triborate is desired, 3 equivalents, or slightly less, such as 2.8 equivalents, of boric acid is used for each mole of amine. If only the tetraborate is desired, 4 equivalents of boric acid should be used for each mole of amine. As already stated, the reactants can be dry, or there may be present a solvent sufficient only to form a slurry of the reactants, or a non-solvent liquid medium. Thus, the reaction may be carried out with the reactants slurried in water, an alcohol or a hydrocarbon. Whether or not a liquid reaction medium is employed, it is preferred to bring the reactants into intimate dynamic admixture, as for example by ball milling or by an equivalent operation. Following the reaction any liquid medium may be removed by evaporation, while if dry reactants were employed all that is required is to dry the product in an oven to remove water formed in the reaction and any unchanged amine.

The new compounds, the tri- and tetraborates of cyclohexylamine, are useful as corrosion inhibitors for ferrous metals. They may be used in the form of a solution with which the metal to be protected is in contact, or they can also be used with advantage in wrappings in which articles of ferrous metals are packed, or they can be sprinkled in powder form on the articles. Very useful anti-corrosion wrappings can be made by impregnating paper or other wrapping material with a solution of the cyclohexylamine tri- or tetraborate, and evaporating off the solvent, leaving the amine borate in the material. Use of the compounds as corrosion inhibitors for ferrous metals is disclosed and claimed in copending application Serial Number 365,485, filed May 6, 1964 by Raymond Thompson, Michael Peter Brown, Howard Bernard Silver, and Anthony Edward Dann.

That the tri- and tetraborates of these particular amines could be made at all, let alone by the simple methods described, was surprising, as tri- and tetraborates are very uncommon; in particular, so far as is known, no tri- or tetraborate of an amine has ever before been made. Even more surprising is the stability of the new borates; hydrated cyclohexylamine tetraborate is congruent with its own aqueous solution and can be crystallized therefrom unchanged. The triborate is not quite so stable as this, and on repeated crystallization from aqueous solution tends to go over to the tetraborate, but the degree of stability is nevertheless remarkably high.

The invention is illustrated by the following examples.

EXAMPLE I

*Cyclohexylamine triborate-heterogeneous system*

Cyclohexylamine (50 g.; 0.504 mole) and boric acid (93.5 g.; 1.51 moles) were mixed in a ball-mill and milled together for 3 hours. The mill and contents were then dried in an oven at 80° C. for 15 minutes, and the dry, lumpy product was finally ball-milled for a further 5 minutes to yield 120 g. (95.7%) of a fine powdery product.

Analysis:

|  | Cyclohexylamine | $B_2O_3$ | Water |
|---|---|---|---|
| Percent | 39.9 | 42.5 | 17.6 |
| Ratio | 1 | 1.52 | 2.43 |

Formula: $C_6H_{11}NH_2 \cdot 1.5 B_2O_3 \cdot 2.5 H_2O$.

EXAMPLE II

*Cyclohexylamine triborate-homogeneous phase*

Cyclohexylamine (100 g.; 1.08 mole) and boric acid (125 g.; 2.02 moles) were mixed with 250 ml. water and heated with stirring to 100° C. A clear solution was obtained which yielded a white crystalline product on cooling. The solid was isolated by filtration and dried in an oven at 80° C. for 2.5 hours. The weight of the product was 83.3 g., corresponding to a yield of 51.6%.

Analysis:

|  | Cyclohexylamine | $B_2O_3$ | Water |
|---|---|---|---|
| Percent | 40.1 | 43.6 | 16.3 |
| Ratio | 1 | 1.55 | 2.23 |

EXAMPLE III

*Cyclohexylamine tetraborate*

Cyclohexylamine (100 g.; 1.08 mole) and boric acid (250 g.; 4.04 moles) were mixed with 250 ml. water and heated with stirring. A clear solution was obtained which yielded a white crystalline product on cooling. The solid was filtered and air dried. It then weighed 241 g. (yield 76.5%).

Analysis:

|  | Cyclohexylamine | $B_2O_3$ | Water |
|---|---|---|---|
| Percent | 31.5 | 44.7 | 23.8 |
| Ratio | 1.0 | 2.02 | 4.15 |

Formula: $C_6H_{11}NH_2 \cdot 2 B_2O_3 \cdot 4 H_2O$.

Some of the product so obtained was recrystallized from water at 90° C. The solution was cooled and the product filtered and dried as before.

Analysis:

|  | Cyclohexylamine | $B_2O_3$ | Water |
|---|---|---|---|
| Percent | 32.0 | 45.1 | 23.0 |
| Ratio | 1 | 2.01 | 3.95 |

Other modes of applying the principle of the invention may be employed, change being made as regards the details described, provided the features stated in any of the following claims or the equivalent of such be employed.

We, therefore, particularly point out and distinctly claim as our invention:

1. A cyclohexylamine borate selected from the group consisting of cyclohexylamine triborate and cyclohexylamine tetraborate.
2. A cyclohexylamine borate according to claim 1 in the hydrated form.
3. Cyclohexylamine triborate.
4. Cyclohexylamine tetraborate.
5. Cyclohexylamine triborate hydrate of the formula $C_6H_{11}NH_2 \cdot 1.5B_2O_3 \cdot 2.5H_2O$.
6. Cyclohexylamine tetraborate hydrate of the formula $C_6H_{11}NH_2 \cdot 2B_2O_3 \cdot 4H_2O$.
7. The method of producing cyclohexylamine triborate which comprises reacting boric acid with cyclohexylamine in a molar ratio of about 2 to 3 moles of boric acid to 1 mole of cyclohexylamine.
8. The method of claim 7 in which said molar ratio is about 2.8 to 3 moles of boric acid to 1 mole of cyclohexylamine and said reactants are ball-milled.
9. The method of producing cyclohexylamine tetraborate which comprises reacting boric acid with cyclohexylamine in a molar ratio of about 4 moles of boric acid to 1 mole of cyclohexylamine.
10. The method of producing cyclohexylamine tetraborate which comprises heating at an elevated temperature an aqueous solution of boric acid and cyclohexylamine in a molar ratio of about 4 moles of boric acid to 1 mole of cyclohexylamine, and separating said cyclohexylamine tetraborate from the reaction mixture.

References Cited by the Examiner

UNITED STATES PATENTS 2,710,401   6/1955   Rowe _____ 260—563

FOREIGN PATENTS 1,265,512   5/1961   France.

OTHER REFERENCES

Petersen et al.: J.A.C.S., vol. 81, pp. 3264–3267 (1959).

CHARLES B. PARKER, *Primary Examiner.*

FLOYD D. HIGEL, ROBERT V. HINES,
*Assistant Examiners.*